No. 792,113.                                                  Patented June 13, 1905.

UNITED STATES PATENT OFFICE.

WILLIAM N. BLAKEMAN, JR., OF NEW YORK, N. Y.

OIL AND PROCESS OF MAKING SAME.

SPECIFICATION forming part of Letters Patent No. 792,113, dated June 13, 1905.

Application filed August 18, 1904. Serial No. 221,201.

*To all whom it may concern:*

Be it known that I, WILLIAM N. BLAKEMAN, Jr., a citizen of the United States, and a resident of the borough of Manhattan, in the city, county, and State of New York, have invented a new and useful Oil and Process of Making the Same, which invention is fully set forth in the following specification.

The object of this invention is to produce an oil which may be used as an economical and quick-drying vehicle for pigments and for other purposes in the arts; and the invention consists in the use of an oil which has been elaidinized by being subjected to the action of an oxid or oxygen acid of nitrogen, as hereinafter described and claimed.

In carrying out my invention I first elaidinize an oil or fat by subjecting it to the action of an oxid of nitrogen, and for this purpose any of the oxids of nitrogen, including the oxygen acids, may be used either separately or in mixture. I prefer to use either the protoxid, the trioxid, also known as "nitrous acid" and "nitrous-acid anhydrid," or the red fumes of fuming nitric acid, also known as "red nitric acid."

Selecting linseed-oil as the oil to be elaidinized, I subject it in a tall column to the action of the red fumes of fuming nitric acid until saturation is reached, washing thoroughly, if necessary. I then incorporate about one or two per cent. of this fully-elaidinized oil with commercial linseed, cotton, or other oil which it is desired to use as a vehicle, adding, if desired, another drying-oil to the mixture. This mixture will form a satisfactory vehicle for all pigments hydrated and anhydrous and will improve their spreading and drying properties.

In elaidinizing the oil the fumes of the nitric acid may act in some cases with so much energy as to cause immediate flocks, and I have found that this can be largely prevented and a more even reaction obtained by first partially elaidinizing the oil by subjecting it to the action of nitrous-acid anhydrid until a perceptible deepening of color is apparent and then completing the elaidinizing by subjecting the oil to the red fumes of fuming nitric acid.

A more satisfactory result will be produced if the oil vehicle with which the fully-elaidinized oil is incorporated is itself partially elaidinized before the incorporation is made. Thus, for example, I take a portion of cotton-oil and submit it in a tall column to the action of nitrous-acid anhydrid in fine bubbles until the oil is partially elaidinized, as shown by a slight deepening of color. I then submit another portion of cotton-oil to the red fumes of fuming nitric acid until saturation is reached. By combining ten per cent. of the fully-elaidinized cotton-oil with seventy-five per cent. of the partially-elaidinized cotton-oil and adding fifteen per cent. of a drying-oil—say, tung-oil—a very economical and satisfactory vehicle will be formed for all anhydrous pigments.

Instead of or in addition to partially elaidinizing the cotton-oil it may be oxidized by heating on ten or fifteen per cent. of manganese black oxid to 260° or 280° Fahrenheit, and then the fully-elaidinized cotton-oil and the tung-oil may be added with the same ultimate effects. In fact, any of the oils employed in carrying out my invention may, if it be found advisable, be first oxidized and then elaidinized, or vice versa, the object of the preliminary step being to make the oil more susceptible to the succeeding reaction and to produce in the final product a more energetic compound. An oil vehicle thus treated by being both oxidized and partly elaidinized may be used itself as a vehicle for paints without the addition of any other oil, but will be found slow in drying compared with the vehicle previously described.

Any of the drying fatty oils, the non-drying fatty oils, or the rosin oils may be treated with an oxid of nitrogen in carrying out my invention. I have so treated olive, castor, cotton, sunflower, ben or sesame, linseed, tung, and rosin oils, and by the use of the terms "elaidinize," "elaidinized," and "elaidinizing" in this specification and in the claims I intend to include the process (and its resulting product) of treating any of the substances named with an oxid of nitrogen.

Any of the fatty oils mentioned may be used as vehicles; but cotton, sunflower, and corn oils will be found the most economical, and if it be desired to add a drying-oil to the compound either raw linseed-oil, boiled linseed-oil, or tung or Chinese wood oil may be used. A commercial liquid drier or other drier may also be added, if desired.

The elaidinizing of the oil may be carried out in any manner dictated by practice, and heat, pressure, and agitation may be employed at any stage of the process, if found necessary.

An oil treated according to my invention will be found an economical, satisfactory, and quick-drying vehicle for all pigments in paint compounds and a tough and elastic bond for all fibrous and comminuted material. I do not, however, herein claim such paint compound, the same being claimed in another application filed herewith bearing the Serial No. 221,202.

Having thus fully described my invention, I claim—

1. As a new composition of matter, a compound or mixture of an oil, an elaidinized oil and a drying-oil.

2. As a new composition of matter, a compound or mixture of fatty oil, an elaidinized oil, and a drying-oil.

3. As a new composition of matter, a compound or mixture of a non-drying fatty oil, an elaidinized oil and a drying-oil.

4. A compound or mixture of an elaidinized oil and tung-oil.

5. A compound or mixture of an elaidinized fatty oil and tung-oil.

6. As a new composition of matter, a compound or mixture of an elaidinized non-drying fatty oil and tung-oil.

7. As a new composition of matter, a compound or mixture of a non-drying fatty oil, an elaidinized oil, and tung-oil.

8. As a new composition of matter, a compound or mixture of a non-drying fatty oil, an elaidinized non-drying fatty oil, and tung-oil.

9. As a new composition of matter, a compound or mixture of a partly-elaidinized non-drying fatty oil, a fully-elaidinized non-drying fatty oil, and tung-oil.

10. A compound or mixture of a partially-elaidinized non-drying fatty oil, and a fully-elaidinized non-drying fatty oil.

11. A compound or mixture of a partially-elaidinized non-drying fatty oil; a fully-elaidinized non-drying fatty oil; and a drying-oil.

12. As a new composition of matter, an oil oxidized and elaidinized as described.

13. As a new composition of matter, a compound or mixture of an oxidized and elaidinized oil and another oil.

14. As a new composition of matter, a non-drying fatty oil oxidized and elaidinized as described.

15. As a new composition of matter, a compound or mixture of a non-drying fatty oil, oxidized and elaidinized, and another oil.

16. As a new composition of matter, a compound or mixture of elaidinized cotton-oil and a drying-oil.

17. As a new composition of matter, a compound or mixture of elaidinized cotton-oil and tung-oil.

18. As a new composition of matter, a compound or mixture of elaidinized cotton-oil, another oil, and tung-oil.

19. The process herein described, which consists in first elaidinizing a non-drying fatty oil and then incorporating the same with a drying-oil.

20. The process herein described, which consists in first subjecting a non-drying oil to the action of an oxid of nitrogen, and then incorporating the product with a drying-oil.

21. The process herein described which consists in first elaidinizing an oil, and then incorporating it with another oil and a drying-oil.

22. The process herein described which consists in first elaidinizing an oil, then incorporating it with another oil and tung-oil.

23. The process herein described which consists in first elaidinizing a non-drying fatty oil and then mixing the same with tung-oil.

24. The process herein described which consists in partly elaidinizing a non-drying fatty oil, fully elaidinizing a non-drying fatty oil, and then mixing said oils with a drying-oil.

25. The process herein described which consists in elaidinizing cotton-oil and then mixing the same with a drying-oil.

26. The process herein described which consists in elaidinizing cotton-oil and then mixing the same with tung-oil.

27. The process herein described, which consists in elaidinizing cotton-oil and then mixing the same with tung-oil and another oil.

28. The process herein described, which consists in first oxidizing and elaidinizing an oil, and then incorporating the same with another oil.

29. The process herein described, which consists in first oxidizing and elaidinizing a non-drying fatty oil, and then incorporating the same with another oil.

30. The process herein described, which consists in oxidizing an oil and subjecting it to the action of an oxid of nitrogen, and then incorporating the same with another oil.

31. The process herein described, which consists in oxidizing a non-drying fatty oil and subjecting it to the action of an oxid of nitrogen, and then incorporating the same with another oil.

WM. N. BLAKEMAN, Jr.

Witnesses:
FRANCIS P. REILLY,
MABEL O. FAHNESTOCK.